United States Patent
Hen et al.

(10) Patent No.: US 12,242,600 B2
(45) Date of Patent: Mar. 4, 2025

(54) ABNORMALLY PERMISSIVE ROLE DEFINITION DETECTION SYSTEMS

(71) Applicant: Microsoft Technology Licensing, LLC, Redmond, WA (US)

(72) Inventors: Idan Yehoshua Hen, Tel-Aviv (IL); Ilay Grossman, Tel-Aviv (IL); Avichai Ben David, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 630 days.

(21) Appl. No.: 17/320,010

(22) Filed: May 13, 2021

(65) Prior Publication Data

US 2022/0366039 A1    Nov. 17, 2022

(51) Int. Cl.
 *G06F 21/55* (2013.01)
 *G06N 5/04* (2023.01)
 *G06N 20/00* (2019.01)

(52) U.S. Cl.
 CPC ............ *G06F 21/554* (2013.01); *G06N 5/04* (2013.01); *G06N 20/00* (2019.01); *G06F 2221/034* (2013.01)

(58) Field of Classification Search
 None
 See application file for complete search history.

(56) References Cited

U.S. PATENT DOCUMENTS

| | | | |
|---|---|---|---|
| 9,424,416 B1 * | 8/2016 | Choudhary | G06F 21/44 |
| 9,471,797 B1 | 10/2016 | Biller et al. | |
| 10,049,227 B1 * | 8/2018 | Sampson | G06F 21/6218 |
| 10,346,626 B1 * | 7/2019 | Pratt | G06F 21/6218 |
| 10,432,637 B2 * | 10/2019 | Kuehr-McLaren | H04L 63/101 |
| 10,862,928 B1 * | 12/2020 | Badawy | G06F 21/604 |
| 11,102,204 B1 * | 8/2021 | Jacques de Kadt | H04L 9/3239 |
| 11,238,383 B2 * | 2/2022 | Mansour | G06Q 10/06393 |
| 11,240,204 B2 * | 2/2022 | Patil | H04L 63/1416 |
| 11,575,680 B1 * | 2/2023 | Challey | G06N 20/00 |
| 11,722,491 B1 * | 8/2023 | Al-Rashid | H04L 63/1433 |
| 11,770,398 B1 * | 9/2023 | Erlingsson | G06F 16/3329 709/224 |
| 11,848,827 B1 * | 12/2023 | Haefner | H04L 41/142 |
| 11,886,872 B1 * | 1/2024 | Bienkowski | G06F 8/71 |

(Continued)

OTHER PUBLICATIONS

Goet; Azure Sentinel: designing access and authorizations that meet the enterprise needs; 2019; retrieve from the Internet https://medium.com/wortell/azure-sentinel-designing-access-and-authorizations-that-meet-the-enterprise-needs-501bfdafaa5f; pp. 1-23, as printed. (Year: 2019).*

(Continued)

*Primary Examiner* — Michael W Chao
(74) *Attorney, Agent, or Firm* — Wade IP Law PLLC

(57) ABSTRACT

A system to detect an abnormally permissive role definition, which can include an abnormally permissive custom role definition, and take action is described. The system receives a role definition for a security principal over a scope of resources in which the role definition includes a built-in role and a custom role. Permissions of the role definition and a creation event of the role definition are analyzed. A security score based on the role definition and creation event for the scope of resources is determined. An action is taken based on the security score and the creation event analysis.

20 Claims, 3 Drawing Sheets

(56) References Cited

U.S. PATENT DOCUMENTS

| | | | | |
|---|---|---|---|---|
| 2002/0026591 | A1* | 2/2002 | Hartley | G06Q 30/06 709/224 |
| 2002/0184521 | A1* | 12/2002 | Lucovsky | G06F 21/6218 726/6 |
| 2010/0325160 | A1* | 12/2010 | Grebenik | G06F 21/6218 707/812 |
| 2011/0219425 | A1* | 9/2011 | Xiong | G06F 21/00 726/28 |
| 2014/0143149 | A1* | 5/2014 | Aissi | H04W 12/30 455/411 |
| 2014/0215604 | A1* | 7/2014 | Giblin | G06F 21/6218 726/21 |
| 2014/0359692 | A1 | 12/2014 | Chari et al. | |
| 2017/0070527 | A1* | 3/2017 | Bailey | H04L 43/12 |
| 2017/0126650 | A1* | 5/2017 | Hay | G06F 16/9535 |
| 2018/0097849 | A1* | 4/2018 | Arquero | H04L 63/105 |
| 2019/0260754 | A1 | 8/2019 | Hecht | |
| 2020/0028850 | A1* | 1/2020 | Ouellette | H04L 63/08 |
| 2020/0076818 | A1* | 3/2020 | Krishnan | H04L 63/102 |
| 2020/0135049 | A1* | 4/2020 | Atencio | A63F 13/46 |
| 2020/0364355 | A1* | 11/2020 | Chen | G06Q 10/10 |
| 2020/0403996 | A1* | 12/2020 | Parimi | H04L 63/20 |
| 2020/0404010 | A1* | 12/2020 | Costante | H04L 63/1425 |
| 2020/0412726 | A1* | 12/2020 | Nevatia | H04L 63/102 |
| 2021/0051153 | A1* | 2/2021 | Bogdanich Espina | H04L 63/105 |
| 2021/0099490 | A1* | 4/2021 | Crabtree | H04L 63/20 |
| 2021/0243190 | A1* | 8/2021 | Bargury | G06F 21/6218 |
| 2022/0217156 | A1* | 7/2022 | Wahbo | G06N 3/08 |
| 2022/0269806 | A1* | 8/2022 | Ben-Natan | G06F 21/6218 |
| 2023/0199025 | A1* | 6/2023 | Xu | H04L 63/0861 726/22 |

OTHER PUBLICATIONS

"International Search Report and Written Opinion Issued in PCT Application No. PCT/US22/025664", Mailed Date: Jul. 25, 2022, 11 Pages.

* cited by examiner

ABNORMALLY PERMISSIVE ROLE DEFINITION DETECTION SYSTEMS

BACKGROUND

Cyberattacks can include unauthorized operations done to an item in a computer network such as to an item in a storage device, or storage, and in particular, as unauthorized attempts to access an item in cloud storage. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker. One way to gain access to someone else's storage account is by using social engineering techniques like phishing or by using a storage key that has unintentionally been leaked by an account owner.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

In one example of a cyberattack, an attacker who has gained access to an account may attempt to modify access privileges to perform actions that evade detection. For instance, an attacker who has gained access to an account in an environment such as role-based access system may attempt to create a highly permissive role definition, and then assign the role definition to an entity in the control of the attacker to perform actions without detection. In another example, the attacker can update a role definition to escalate privileges of the account holder for cases in which the account holder has weak custom role definitions but the ability to update the custom role definition to make it more permissive. Custom role definitions in an identity access management system are particularly difficult to monitor and determine whether an attack has occurred or is occurring.

A system to detect an abnormally permissive role definition, which can include an abnormally permissive custom role definition, and take action is described. The system receives a role definition for a security principal over a scope of resources in which the role definition includes a built-in role and a custom role. Permissions of the role definition and a creation event of the role definition are analyzed. A security score based on the role definition event for the scope of resources is determined. An action is taken based on the security score and the creation event analysis. Examples of possible actions based on the security score can include preventing access to the resources, alerting an administrator, or actively allowing the access.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
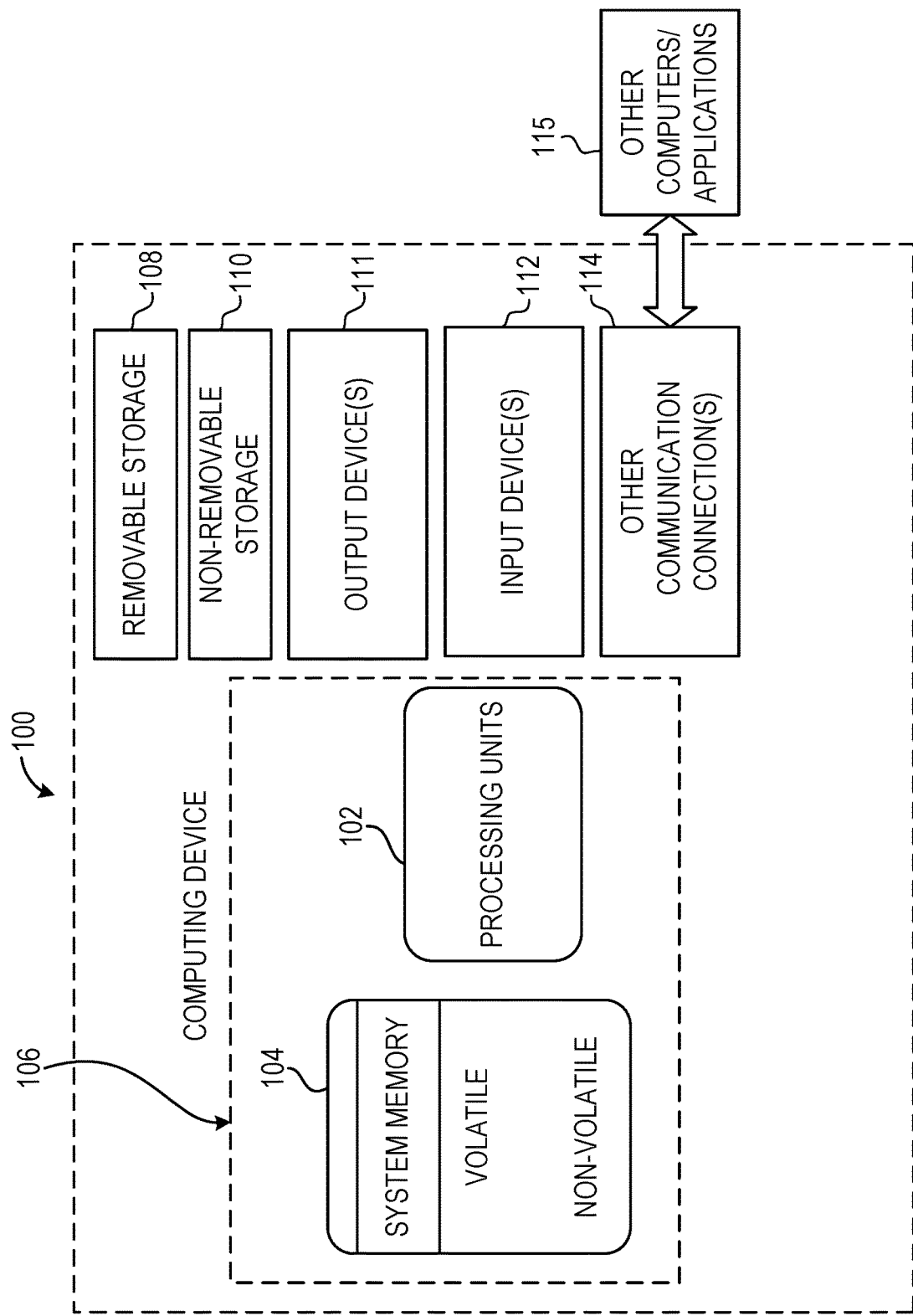
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Computer networks used by an enterprise, such as a cloud computing system, may include identity and access management, which provides a framework of policies and technologies to facilitate the appropriate users in the enterprise have the access to technology resources for the enterprise. In one example, a role based access controller can be included in a network domain controller to allow access to the resources, authenticate users, store user account information, and enforce security policies for the domain.

Figure 2:
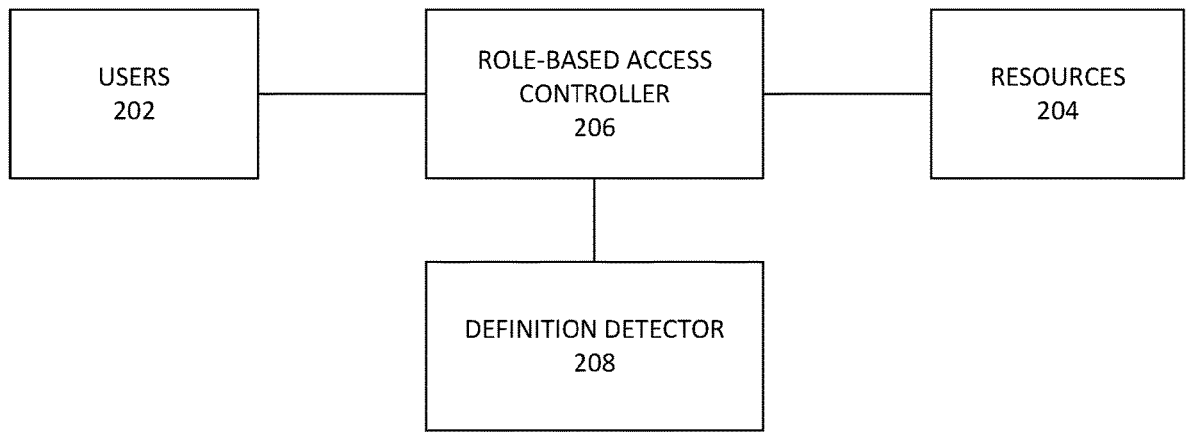
FIG. 2 is a block diagram illustrating an example computer network such as a cloud-computing environment including a permissive role definition detector that can be implemented with the computing device of FIG. 1.

FIG. 2 illustrates an example computer network 200, such as a local network, a cloud computing network, or a combination of networks that may include a set of users 202 such as users of an enterprise, a set of network items 204 such as enterprise resources accessible or accessed by the users 202, a role-based access controller 206 to restrict network access of the network items 204 grounded on roles of users 202 within the enterprise, and a permissive role definition detector 208 to detect abnormal or highly permissible role definitions in the role-based access controller 206 and to take action to address the abnormal or highly permissible role definition.

In the example, the role-based access controller 206 can provide access privileges to information in network items 204 that users 202 apply to do their jobs and prevents users 202 from accessing information that does not pertain to them. In a role-based access control model, a user's role in an enterprise determines the permissions that user is granted and provides that certain employees, for example, cannot access sensitive information or perform high-level tasks that are irrelevant to their jobs. In the role-based access control data model, roles can be determined from several factors, including authorization, responsibility and job competency. As such, enterprises can designate whether a user is an end user, an administrator or a specialist user. In addition, access to network resources can be limited to specific tasks, such as the ability to view, create or modify files. Limiting network access may be applicable for enterprise that have many employees, employ contractors or permit access to third parties, like customers and vendors, which makes access monitoring difficult. The role-based access controller 206 can provide for fine-grained access management to network items 204. In one example, the role-based access controller 206 can be implemented as an on-premises program running on a computing device to manage a local network or in cloud-based service to manage network items 204 that may be located in a local network or in a cloud as cloud-based storage items that are allocated by a cloud service using infrastructure. Similarly, the permissive role definition detector 208 can be implemented as an on-premises program running on a computing device to manage a local role-based access controller or in a cloud to manage a local role-based access controller or a role-based access controller as part of a cloud service using infrastructure.

Figure 3:
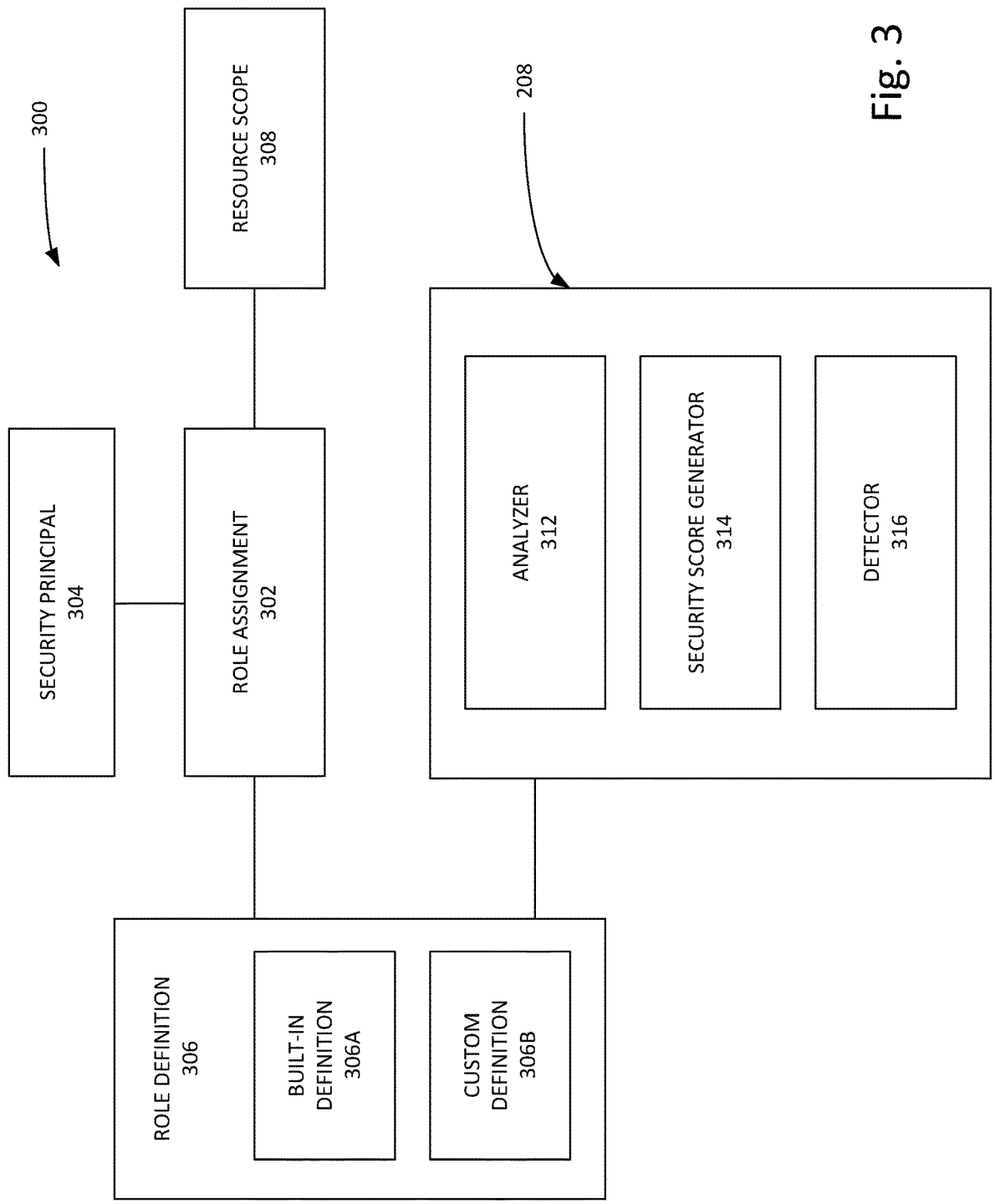
FIG. 3 is a block diagram illustrating an example role-based access controller for use with the permissive role definition detector of the network of FIG. 2.

FIG. 3 illustrates a system 300 having an example role-based access controller 206 operably coupled to an example permissive role definition detector 208. In one example, the example role-based access controller 206 and permissive role definition detector 208 implemented via programs running on computing devices in cloud-based infrastructure. The role-based access controller 206 develops a system role assignment 302 to enforce permissions, which system role assignments 302 include and application of a security principal 304, a role definition 306, and a resource scope 308.

The security principal 304 can include an object that represents a user 202, a group of users 202, a user 202 as a service principal, or a managed identity of a user 202 that is requesting access to the network items 204. For example, a group of users can be defined from a set of profiles in an active directory. A role can be assigned to these objects. The role definition 306, which may be referred to a role, is a collection of permissions. The role definition 306, in one example, lists operations that can be performed, such as read, write, delete, and role definitions can be high level such as owner, or more specific such as virtual machine reader. Permissions can include sanctioned operations as well as prohibited operations. Role definition 306 can include built-in role definitions 306a such as role definitions of permissions that are predefined in the system 300 and custom role definitions 306b such as created by, for example, administrators of the enterprise. For example, a custom role definition 306b can be created if the available built-in roles 306a of system 300 are not specific enough for the enterprise. The resource scope 308 refers to the set of network items 204 to which the permissions apply. The set of network items 204 can be arranged in a multi-level hierarchy or taxonomy model such as levels for management group, subscription, resource group, and individual resources. A role assignment 302 can further limit permissions by limiting the resource scope 308 such as assigning a user to be Website Contributor but then limited the resource scope to one resource group. In some examples, resource scope 308 is a feature separate from the role definition 306. In other examples, resource scope 308 can be included as an aspect of the role definition 306.

The role assignment 302 is the result of attached a role definition 306 to a security principal 304 at a particular resource scope 308 for the purposes of granting access via permissions. Users 202 are granted access permission to selected network items 204 via the role assignment 302 and access is revoked by removing the role assignment 302. In some examples, a user may be the subject of a plurality of role assignments 302. In some examples, role assignments are additive so that permissions are the sum of the role assignments. Some examples of role assignments 302 can include deny assignments or features of deny assignments that attach a set of deny actions, or prohibited operations in a role definition 306 to a security principal 304 at a particular scope 308 to deny access. The role assignment 302 can define actions or operations that are allowed as well as actions or operations that are not allowed. A deny assignment may block a user from an access or performing an action even if, for instance, a built-in role 306a grants the user access.

In one example, a resource manager, which can be included with the service with controller 206 is used to access the network items 204. A user 202 (or service principal) acquires a token for the resource manager. The token can include the user's group memberships. The user makes request, such as a REST API call, to the resource manager with the token attached. The resource manager can retrieve the role assignments and deny assignments that apply to the resource upon which the action is being taken. The resource manager narrows the role assignments that apply to this user or their group and determines what roles the user has for this resource. The resource manager determines if the action in the request is included in the roles the user has for the particular resource. If the user doesn't have a role with the action at the requested scope, access is not granted. Otherwise, the resource manager checks if a deny assignment applies. If a deny assignment applies, access is blocked. Otherwise, access is granted.

In some examples, the role definition 306 can be constructed from a schema. The schema can include strings for the name of the role definition, a brief description of the role definition, and, if applicable, an identifier code for the role definition. The schema may include a string or Boolean as to whether the role definition is a custom role definition 306b. The role definition can also list assignable scope, such as a list of which scopes or levels of scopes can utilize the role definition 306. The schema can include a set of permissions, such as actions, notActions, dataActions, and notDataActions. For instance, actions include allowed operations for a resources control plane as set forth in a regular expression; notActions are denied operations for a resources control plane as set forth in a regular expression; dataActions include allowed operations for a resources data plane as set forth in a regular expression; and notDataActions are denied operations for a resources data plane as set forth in a regular expression. In a built-in role definition 306a, the schema has been preassigned with objects or expressions. In a custom role definition 306b, an administrator can build the role definition on behalf of the enterprise with expressions or objects into the schema.

System 300 can keep track of actions with a number of mechanisms, such as via logs (not shown) that account for metadata such as who, what, where, when, and how for changes or updates to the role definition or other features of system such as scope.

Cyberattacks can include unauthorized operations done to an item in a computer network such as to an item in a storage device, or storage, and in particular, as unauthorized attempts to access an item in cloud storage. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker. One way to gain access to someone else's account is by using social engineering techniques like phishing or by using a storage key that has unintentionally been leaked by an account owner. Hence, one challenge of storage security is to recognize suspicious activity in an account even when the activity is apparently being done by a legitimate user of the account.

In one example, an attacker who has gained access to an account may attempt to modify access privileges to perform actions that evade detection. For instance, an attacker who has gained access to an account in an environment such as system 300 may attempt to create a highly permissive role definition, and then assign the role definition to an entity in the control of the attacker to perform actions without detection. In one example, the actions within the role-based permissions or built-in RBAC roles avoid detection. In another example, the attacker can update a role definition to escalate privileges of the account holder for cases in which the account holder has weak custom role definitions but the ability to update the custom role definition to make it more permissive. In some examples, logs may be overwritten, and may not contain useful data regarding an attack if administrators or forensics personnel attempt to analyze an attack or a modified permission after the fact.

In the illustrated example, the permissive role definition detector 208 is constructed from a plurality of interconnected components. The example permissive role definition detector 208 includes an analyzer 312, a security score generator 314, and detector 316. In one example, the analyzer 312 includes a set of rule-based logic to analyze events, or actions, regarding the circumstances of a creation of a role definition as it applies to a security principal over a scope of resources, or the role definition creation event. In one example, the permissive role definition detector 208 has access to the logs and other information regarding the creation or modification of a role definition in the system 300. The analyzer 312 can determine the relative level or amount of permissions of a role definition, and circumstances of the creation of the role definition such as who created the role definition, when was it created, what was the role definition prior to the current role definition, what was the scope prior to the current scope, and other issues. In one example, a rule may be used that determines how often does the creator of the role definition create role definitions of the enterprise, or a rule may be used that determines the level or amount of changes in the permissions of the custom role definition. In one example, the analyzer 312 is able to parse or iterate over the set of permissions in the schema including the custom role definitions to determine the relative level or amount of permissions of a role definition, and circumstances of the creation of the role definition.

The security score generator 314 can be based on a machine learning model that can receive role definition creation events for various scopes, such as various levels of scope. The machine learning model can determine trends and expected actions based on the various creation events for the enterprise, which may apply to a plurality of security principals and various scopes. The machine learning model, including anomaly detection, learns behavioral patterns across different levels, such as assigner and tenant, based on information including the software being used to issue the operation, when it was issued and from where. This information is engineered into features on which a machine learning model can be trained. A security score can be generated and based upon an irregular set of role definition creation events and the relative amount of permissions. For instance, an irregular role definition creation event combined with a high amount of permission, such as a high amount of permission in a custom role definition, may generate a relatively high or low security score based on a selected relative scale. The security score can be adjusted or modified based on an analysis of the role definition from the analyzer 312 to obtain a final security score. For instance, the security score generator can include a set of rules that determine if the role definition creation event was suspicious, based on the importance of each score and indicators from the analyzer to the determination.

The final security score can be applied via the detector 316, which can take an action based on the recommendation score. Examples of possible actions based on the security score can include preventing access to the resources, alerting an administrator, or actively allowing the access. In some examples, a security score is compared to a threshold, and an action is taken depending on how the security score relates to the threshold in a selected manner. For instance, a relatively low security score may be indicative of high security risk, and a threshold value may be set such that security scores falling below the threshold value are denied access pending an administrator action while security scores falling above the threshold value are allowed access. In other examples, a plurality of actions can be implemented based on a plurality of thresholds. For example, two threshold values may be used in which a first threshold value is greater than a second threshold value. In this example, security scores falling above the first threshold value are allowed access; security scores falling between the first and second threshold value may provide a conditional access and an alert to an administrator; and security scores below the second threshold value are denied access.

Figure 4:
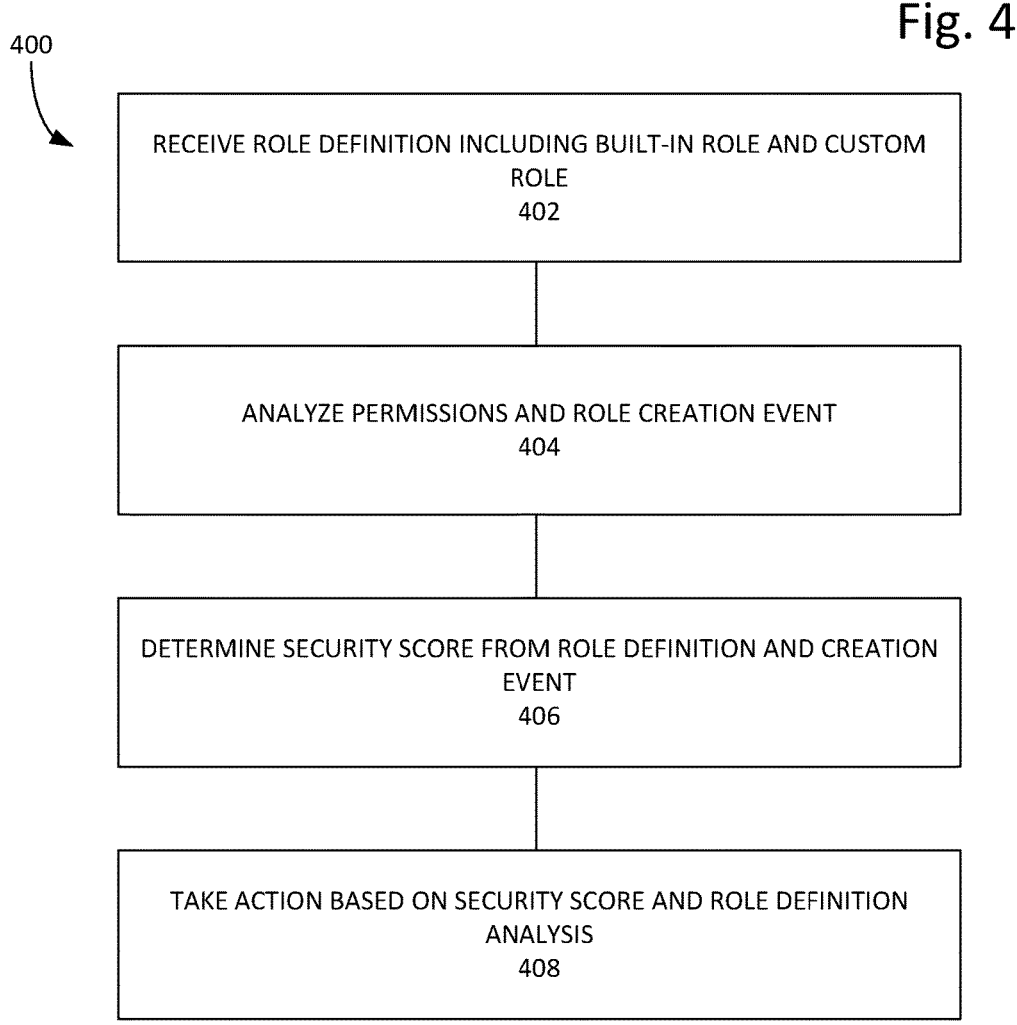
FIG. 4 is a block diagram illustrating an example method of the permissive role definition detector of FIG. 2.

FIG. 4 illustrates a method 400 performed with or assisted by the permissive role definition detector 208 to provide cybersecurity for a device. In one example, the method 400 is implemented as system having a processor and a memory device such as processor 102 and memory 104 on computing device 100. The memory device, such as memory 104 can be applied to store computer executable instructions for causing the processor 102 to perform the method 400, such as a program for intrusion detection. The program for intrusion detection can include a program for analyzing the role definition permissions and creation events such as a program for analyzer 312, a program to provide the machine learning model to generate and modify the security score, such as a program for security score generator 314, and a program for a detector, such as the detector 316. The method 400 provides cybersecurity for a device, which can include a computing device 100, a plurality of computing devices 100 that may be networked together, and a system including a role-based access controller 206 that may be located on premises or in a cloud system. In one example, the method 400 is implemented with permissive role definition detector 208 that includes analyzer 312, security score generator 314, and detector 316. In the example, the method 400 is applied to the role definition, including the custom role definition Method 400 includes receiving a role definition for a security principal over a scope of resources, the role definition including a built-in role and a custom role at 402. In the example, the received role definition is stored in a memory device. Permissions of the role definition and a creation event of the role definition are analyzed at 404. A security score based on the role definition and creation event for the scope of resources is determined at 406. An action is taken based on the security score and the creation event analysis at 408. Examples of possible actions based on the security score can include preventing access to the resources, alerting an administrator, or actively allowing the access.

In an example of the analysis of the role definition and a creation event of the role definition at 404, rule-based logic can be applied to review the circumstances of the role definition creation event based on indicators in data received by method, such as data from logs. In one example, the allowed operations, and, if applicable, the denied operations—such as the actions, notActions, dataActions, and notDataActions—of the role definition from the schema, are analyzed such as iterated to determine information that can include whether privileged operations are allowed, which privileged operations are allowed, and whether the privilege is relatively high. Other indicators can be received and analyzed at 404 to determine information as to the previously created privileges.

In an example, for the determination of a security score based on the role definition and creation event for the scope of resources at 406, a machine learning model can receive role definition creation events for various scopes, such as various levels of scope. The machine learning model can determine trends and expected actions based on the various creation events for the enterprise, which may apply to a plurality of security principals and various scopes. The machine learning model, including anomaly detection, learns behavioral patterns across different levels, such as assigner and tenant, based on information including the software being used to issue the operation, when it was issued and from where. This information is engineered into features on which a machine learning model can be trained. A security score can be generated and based upon an irregular set of role definition creation events and the relative amount of permissions. For instance, an irregular role definition creation event combined with a high amount of permission, such as a high amount of permission in a custom role definition, may generate a relative security score based on a selected scale. The security score of the various contexts, and the considered security indicators, permit the determination of whether the role definition creation is also to be considered as suspicious and trigger an action such as an alert. After analysis and ranking, in one example, role definitions including privileged custom role definitions, and data regarding the role definition creation event are saved to a data structure such as a table in a memory device and can be applied to evaluate custom role definitions for cross-analytic usage.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method to provide cybersecurity, the method comprising:
   receiving a role definition, which is based on a schema, for a security principal regarding a scope of resources, the role definition including a first role definition, which defines a first permission based on a first element that is preassigned to the schema, and a second role definition, which defines a second permission based on a second element that is not preassigned to the schema;
   determining a security score by providing permissions of the role definition, which include at least the first permission and the second permission, and a creation event, which indicates a circumstance of creation of the role definition, as inputs to a machine learning model, which causes the machine learning model to determine that the creation event is an irregular role definition creation event, to determine that the permissions of the role definition correspond to a relatively high amount of permission, and to generate the security score by taking into consideration that the creation event is the irregular role definition creation event and further by taking into consideration that the permissions of the role definition correspond to the relatively high amount of permission;
   comparing the security score to a plurality of security score ranges that are defined by a plurality of thresholds and that correspond to a plurality of actions,
      the plurality of thresholds comprising a first threshold and a second threshold that is less than the first threshold,
      the plurality of actions comprising a first action in which access to a resource in the scope of resources is provided, a second action in which conditional access to the resource is provided, and a third action in which access to the resource is denied,
      the plurality of security score ranges comprising a first security score range that is greater than the first threshold and that corresponds to the first action, a second security score range that is less than the first threshold and greater than the second threshold and that corresponds to the second action, and a third security score range that is less than the second threshold and that corresponds to the third action; and denying access to the resource by selecting the third action from the plurality of actions as a result of the security score being included in the third security score range.

2. The method of claim 1, wherein the analyzing is based on logs that are received from a role-based access controller.

3. The method of claim 1, wherein determining the security score comprises:
causing the machine learning model to analyze the creation event using rule-based logic.

4. The method of claim 3, wherein the security score is based at least on a difference between the first permission and the second permission.

5. The method of claim 1, wherein the plurality of thresholds comprises two thresholds, the two thresholds comprising the first threshold and the second threshold.

6. The method of claim 1, wherein determining the security score comprises:
causing the machine learning model to analyze allowed operations in the schema.

7. The method of claim 6, wherein the schema includes operations of actions, notActions, dataActions, and notDataActions.

8. The method of claim 1, wherein the machine learning model is trained on features that are based on permissions of role definitions and creation events for multiple scopes of resources.

9. The method of claim 1, wherein analyzing the creation event comprises:
determining how often a creator of the role definition, who is indicated by the creation event, creates role definitions.

10. A computer readable storage device to store computer executable instructions to control a processor to:
receive a role definition, which is based on a schema, for a security principal regarding a scope of resources, the role definition including a first role definition, which defines a first permission based on a first element that is preassigned to the schema, and a second role definition, which defines a second permission based on a second element that is not preassigned to the schema;
determine a security score by providing permissions of the role definition, which include at least the first permission and the second permission, and a creation event, which indicates a circumstance of creation of the role definition, as inputs to a machine learning model, which causes the machine learning model to generate the security score by taking into consideration a determination by the machine learning model that the creation event is an irregular role definition creation event and further by taking into consideration a determination by the machine learning model that the permissions of the role definition correspond to a relatively high amount of permission;
compare the security score to a plurality of security score ranges that are defined by a plurality of thresholds and that correspond to a plurality of actions,
the plurality of thresholds comprising a first threshold and a second threshold that is less than the first threshold,
the plurality of actions comprising a first action in which access to a resource in the scope of resources is provided, a second action in which conditional access to the resource is provided, and a third action in which access to the resource is denied,
the plurality of security score ranges comprising a first security score range that is greater than the first threshold and that corresponds to the first action, a second security score range that is less than the first threshold and greater than the second threshold and that corresponds to the second action, and a third security score range that is less than the second threshold and that corresponds to the third action; and
provide access to the resource by selecting the first action from the plurality of actions as a result of the security score being included in the first security score range.

11. The computer readable storage device of claim 10, wherein the computer executable instructions are to control the processor to cause the machine learning model to analyze operations in the schema.

12. The computer readable storage device of claim 10, wherein the computer executable instructions are to control the processor to:
based on the security score reaching a threshold, prevent the access to the resource or provide the conditional access to the resource.

13. The computer readable storage device of claim 10, wherein the machine learning model is trained on features that are based on permissions of role definitions and creation events for multiple scopes of resources.

14. The computer readable storage device of claim 10, wherein the computer executable instructions are to control the processor to cause the machine learning model to analyze the creation event using rule-based logic.

15. A system, comprising:
a memory device to store a set of instructions; and
a processor to execute the set of instructions to:
receive a role definition, which is based on a schema, for a security principal regarding a scope of resources, the role definition including a first role definition, which defines a first permission based on a first element that is preassigned to the schema, and a second role definition, which defines a second permission based on a second element that is not preassigned to the schema;
determine a security score by providing permissions of the role definition, which include at least the first permission and the second permission, and a creation event, which indicates a circumstance of creation of the role definition, as inputs to a machine learning model, which causes the machine learning model to generate the security score by taking into consideration a determination by the machine learning model that the creation event is an irregular role definition creation event and further by taking into consideration a determination by the machine learning model that the permissions of the role definition correspond to a relatively high amount of permission;
compare the security score to a plurality of security score ranges that are defined by a plurality of thresholds and that correspond to a plurality of actions,
the plurality of thresholds comprising a first threshold and a second threshold that is less than the first threshold,
the plurality of actions comprising a first action in which access to a resource in the scope of resources is provided, a second action in which conditional access to the resource is provided, and a third action in which access to the resource is denied, the plurality of security score ranges comprising a first security score range that is greater than the first threshold and that corresponds to the first action, a second security score range that is less than the first threshold and greater than the second threshold and that corresponds to the second action, and a third security score range that is less than the second threshold and that corresponds to the third action; and provide conditional access to the resource by selecting the second action from the plurality of actions as a result of the security score being included in the second security score range.

16. The system of claim 15 included in a cloud-based environment.

17. The system of claim 16, wherein the cloud-based environment includes an identity access management system.

18. The system of claim 15, wherein the creation event indicates a person who created the role definition.

19. The system of claim 15, wherein the creation event indicates when the role definition was created.

20. The system of claim 15, wherein the processor is to execute the set of instructions to:

determine the security score by providing the permissions of the role definition and the creation event for the scope of resources as the inputs to the machine learning model, which causes the machine learning model to generate the security score based at least on the machine learning model determining that the creation event is the irregular role definition creation event and that the second permission defined by the second role definition corresponds to the relatively high amount of permission.

* * * * *